United States Patent
Wheeler

(10) Patent No.: US 10,684,153 B2
(45) Date of Patent: Jun. 16, 2020

(54) AUTO SWITCHING REFERRAL MATRICES IN DETERMINING PROCESS MATERIAL CONCENTRATION

(71) Applicant: Micro Motion, Inc., Boulder, CO (US)

(72) Inventor: Simon P. H. Wheeler, Erie, CO (US)

(73) Assignee: Micro Motion, Inc., Boulder, CO (US)

( * ) Notice: Subject to any disclaimer, the term of this patent is extended or adjusted under 35 U.S.C. 154(b) by 177 days.

(21) Appl. No.: 14/900,490

(22) PCT Filed: Jul. 18, 2014

(86) PCT No.: PCT/US2014/047274
§ 371 (c)(1),
(2) Date: Dec. 21, 2015

(87) PCT Pub. No.: WO2015/010072
PCT Pub. Date: Jan. 22, 2015

(65) Prior Publication Data
US 2016/0131513 A1 May 12, 2016

Related U.S. Application Data

(60) Provisional application No. 61/856,365, filed on Jul. 19, 2013.

(51) Int. Cl.
*G01F 1/86* (2006.01)
*G01N 29/02* (2006.01)
(Continued)

(52) U.S. Cl.
CPC .............. *G01F 1/86* (2013.01); *G01N 9/00* (2013.01); *G01N 29/02* (2013.01);
(Continued)

(58) Field of Classification Search
CPC ....................................................... G01F 1/86
See application file for complete search history.

(56) References Cited

U.S. PATENT DOCUMENTS

| 7,188,035 B2 | 3/2007 | Matt |
| 2003/0136186 A1 | 7/2003 | Gysling |
| 2007/0028663 A1 | 2/2007 | Patten et al. |

FOREIGN PATENT DOCUMENTS

| EP | 0990898 A1 | 4/2000 |
| JP | 07-294406 A | 10/1995 |

(Continued)

OTHER PUBLICATIONS

"Micro Motion 78226/7828 Insertion Liquid Density Meters: Installation and configuration manual", Micro Motion, Apr. 30, 2011 (Apr. 30, 2011), pp. 1-116, XP055141740, Retrieved from the Internet: URL:http://ww2.emersonprocess.com/siteadmincenter/ PM Micro Motion, Documents/MMI-20019333 AA.PDF [retrieved on Sep. 22, 2014] p. 2 , paragraph 1—p. 4, paragraph2 p. 91, paragraph 1—p. 92, paragraph 4 figures 1-1.

(Continued)

*Primary Examiner* — Matthew G Marini
(74) *Attorney, Agent, or Firm* — The Ollila Law Group LLC

(57) ABSTRACT

A device and method to automatically switch referral matrices in a meter (120) to identify an unknown material circulating in a process application (900) and determine the material concentration, whether it may be a cleaning material or a process material. The present invention utilizes a measured line density and line temperature of the material along with a reference temperature to calculate a reference density. Using the reference temperature and reference density, a concentration percentage of the material may be determined.

13 Claims, 9 Drawing Sheets

(51) Int. Cl.
*G01N 29/44* (2006.01)
*G01N 9/00* (2006.01)

(52) U.S. Cl.
CPC . *G01N 29/4418* (2013.01); *G01N 2291/0224* (2013.01); *G01N 2291/02809* (2013.01); *G01N 2291/02818* (2013.01); *G01N 2291/02881* (2013.01)

(56) References Cited

FOREIGN PATENT DOCUMENTS

| | | | |
|---|---|---|---|
| JP | 09-113433 | A | 2/1997 |
| JP | 2008232890 | A | 10/2008 |
| RU | 2250438 | C2 | 4/2005 |
| WO | 0000793 | A1 | 1/2000 |

OTHER PUBLICATIONS

Micro Motion 7826/7828 Series Density and Concentration Meters: Product data sheet Micro Motion, Apr. 30, 2013 ) Apr. 30, 2013), pp. 1-20, XP055141736, Retrieved from the Internet: URL:http://ww2.emersonprocess.com/siteadmincenter/PM Micro Motion Documents/7826_7828_PDS_ENG_PS001056_G_web.pdf [retrieved on Sep. 22, 2014] p. 3, left hand column, paragraph 1—right-hand column, paragraph 5 pp. 10-13.

Density of NaCl in H₂O at Different Temperatures and Concentrations

| Concentration % | 0 °C | 10 °C | 25 °C | 40 °C | 60 °C | 80 °C | 100 °C |
|---|---|---|---|---|---|---|---|
| 1 | 1.00747 | 1.00707 | 1.00409 | 0.99908 | 0.9900 | 0.9785 | 0.9651 |
| 2 | 1.01509 | 1.01442 | 1.01112 | 1.00593 | 0.9967 | 0.9852 | 0.9719 |
| 4 | 1.03038 | 1.02920 | 1.02530 | 1.01977 | 1.0103 | 0.9988 | 0.9855 |
| 8 | 1.06121 | 1.05907 | 1.05412 | 1.04798 | 1.0381 | 1.0264 | 1.0134 |
| 12 | 1.09244 | 1.08946 | 1.08365 | 1.07699 | 1.0667 | 1.0549 | 1.0420 |
| 16 | 1.12419 | 1.12056 | 1.11401 | 1.10688 | 1.0962 | 1.0842 | 1.0713 |
| 20 | 1.15663 | 1.15254 | 1.14533 | 1.13774 | 1.1268 | 1.1146 | 1.1017 |
| 24 | 1.18999 | 1.18557 | 1.17776 | 1.16971 | 1.1584 | 1.1463 | 1.1331 |
| 26 | 1.20709 | 1.20254 | 1.19443 | 1.18614 | 1.1747 | 1.1626 | 1.1492 |

FIG. 4

Brix

| (Select Any Ref Temp) | T° c | Density | | | |
|---|---|---|---|---|---|
| Ref Temp | 50 | | | | |
| t4 | 60 | 1.0219 | 1.0636 | 1.1321 | 1.2087 |
| | | R40 | R41 | R42 | R43 |
| t3 | 50 | 1.027 | 1.0688 | 1.1377 | 1.2145 |
| | | R30 | R31 | R32 | R33 |
| t2 | 40 | 1.0314 | 1.0735 | 1.1427 | 1.2199 |
| | | R20 | R21 | R22 | R23 |
| t1 | 30 | 1.0351 | 1.0776 | 1.1473 | 1.225 |
| | | R10 | R11 | R12 | R13 |
| t0 | 20 | 1.0381 | 1.081 | 1.1513 | 1.2296 |
| | | R00 | R01 | R02 | R03 |
| | | 10 | 20 | 35 | 50 |
| | | Brix | | | |

FIG. 7

Caustic Soda (NaOH)

| | T° c | Density | | | |
|---|---|---|---|---|---|
| | | | | | |
| t4 | 100 | 0.9693 | 1.0115 | 1.0543 | 1.1700 |
| | | 206 | 223 | 224 | 225 | 226 |
| t3 | 80 | 0.9824 | 1.0248 | 1.0771 | 1.1833 |
| | | 205 | 219 | 220 | 221 | 222 |
| t2 | 50 | 0.9990 | 1.0412 | 1.0942 | 1.2020 |
| | | 204 | 215 | 216 | 217 | 218 |
| t0 | 20 | 1.0095 | 1.0538 | 1.1089 | 1.2191 |
| | | 202 | 207 | 208 | 209 | 210 |
| t1 | 0 | 1.0124 | 1.0598 | 1.1171 | 1.2296 |
| | | 203 | 211 | 212 | 213 | 214 |
| | | 1 | 5 | 10 | 20 |
| | | % Wt | | | |

FIG. 8

AUTO SWITCHING REFERRAL MATRICES IN DETERMINING PROCESS MATERIAL CONCENTRATION

TECHNICAL FIELD

The present invention relates to a device and method to automatically detect a process material concentration. More particularly, the present invention relates to a device and method to automatically switch matrices when determining a product concentration of an unknown material.

Statement of the Problem

Field experience has shown that in many concentration measurement applications, especially those such as food and beverage installations where CIP (clean in place) or SIP (sanitize in place) procedures are needed, the concentration of both the measured application material and that of a cleaning material are needed.

The number of applications requiring concentration measurement of two different materials by the same installation extends far outside the traditionally known food & beverage market. To date, any application where more than a single process material can be present at a measurement point requires more than one measurement or measurement technology. Markets and applications that exhibit this situation include any multi-material transfer pipeline (such as with Oil & Gas), refining, specialty chemical manufacturers, bulk chemical manufacturers, etc.

Currently, secondary concentration applications utilize technologies such as pH and conductivity meters. Use of these secondary measurement technologies requires additional breaks in the process line. These additional process line breaks provide a greater opportunity for leakage of either the application material or the cleaning material into the environment. Given that the cleaning materials are typically toxic, any opportunity to reduce leak points is greatly valued.

As mentioned above, conductivity and pH probes are used to determine the concentration of acid or alkali in the cleaning material. These meters, in addition to the extra capital expenditures required to purchase them, also require significant time and cost for re-calibration and maintenance. Finally, having to manage and train the labor force on multiple measurement technologies can often be confusing, requiring greater training investment costs.

Based on the problems outlined above, there is a need for a single measurement device and method that can accurately and automatically determine process material changes and the concentration of each material.

SUMMARY OF THE INVENTION

The present invention provides a single measurement device and method that automatically switches matrices to determine a process material type and a concentration of an unknown material, whether it may be a cleaning material or an application material. This automatic switching of matrices allows the apparatus to determine when the process material to be measured or manufactured was back in a process point, and thereby, automatically switch the concentration matrix back to the original state.

Advantageously, by utilizing a single measurement device at one measurement point further provides for less possibility of leak points. In prior methods utilizing multiple measurement technologies, the additional breaks into the process line resulted in greater opportunities for leakage of either the application material or the cleaning material into the environment. Given that the cleaning materials are typically toxic, any opportunity to reduce leak points is greatly valued.

Such a measurement device would also be able to improve application safety by indicating not only the correct strength (or incorrect strength) of the cleaning material, but also when the cleaning material had been fully washed out of the application point; thus allowing any manual intervention/maintenance of instrumentation to occur without the risk of hazardous acids or alkalis damaging personnel or equipment.

ASPECTS OF THE INVENTION

According to an aspect, a method of detecting a process material in a process line using a meter containing at least two or more process material matrices, said method comprising the steps of:
measuring a line density of the process material;
measuring a line temperature of the process material; and
identifying a process material matrix from the two or more matrices based on the line density and line temperature.

Preferably, the step of identifying a process material matrix further including the steps of:
comparing the process material line density and line temperature to line density and line temperature values associated with each of the two or more matrices; and
identifying a specific process material matrix if said process material line density and line temperature falls within line density and line temperature values associated with a specific process material matrix.

Preferably, the step of identifying a process material matrix further including the steps of:
comparing the process material line density and line temperature to line density and line temperature values associated with each of the two or more matrices; and
signaling an error if said process material line density and line temperature does not fall within line density and line temperature values associated with a specific process material matrix.

Preferably, the method of detecting a process material in a process line further including the steps of:
determining a reference temperature of the process material;
determining a reference density of the material based on the line density, the line temperature, and the reference temperature; and
determining a concentration of the material based on the reference density and reference temperature.

According to an aspect, a metering system for detecting a process material in a process line, said metering system comprising:
a meter in fluid communication with a process material, wherein the meter is configured to detect a property of the process material; and
meter electronics in communication with a meter, wherein the meter electronics further comprises:
a storage system for storing two or more process material matrices; and
a matrix selection routine for selecting a matrix from the two or more process material matrices based on the property of the process material.

Preferably, the meter electronics further comprises:
a line density routine for determining a line density of the process material;
a temperature signal for measuring a line temperature of the process material; and
a material determination routine for identifying a process material matrix from the two or more matrices based on the line density and line temperature.

Preferably, material determination routine further comprises:
an error routine for signaling an error if said material determination routine fails to identify a process material matrix.

Preferably, the meter electronics further comprises:
a density routine for determining a reference temperature of the process material and a reference density of the material, wherein the reference density is based on the line density and the reference temperature; and
a concentration routine for determining a concentration of the material based on the reference density and reference temperature.

According to an aspect, a meter electronics comprising:
a storage system for storing two or more process material matrices; and
a matrix selection routine for selecting a matrix from the two or more process material matrices based on the property of the process material.

Preferably, the meter electronics further comprising:
a line density routine for determining a line density of the process material;
a temperature signal for measuring a line temperature of the process material; and
a material determination routine for identifying a process material matrix from the two or more matrices based on the line density and line temperature.

Preferably, material determination routine further comprises:
an error routine for signaling an error if said material determination routine fails to identify a process material matrix.

Preferably, the meter electronics further comprising:
a density routine for determining a reference temperature of the process material and a reference density of the material, wherein the reference density is based on the line density and the reference temperature; and
a concentration routine for determining a concentration of the material based on the reference density and reference temperature.

DESCRIPTION OF THE DRAWINGS

The same reference number represents the same element on all drawings. The drawings are not necessarily to scale.
FIG. 4 is a sample reference data table of temperature and density values;
FIG. 7 is a reference data table of temperature and density values of a process material (Brix);
FIG. 8 is a reference table of temperature and density values of a process material (Caustic Soda)

DETAILED DESCRIPTION OF THE INVENTION

FIGS. 1-11 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

A common way to determine concentration of a process material is through density and temperature. Because there is not a one-to-one relationship between density and concentration (see FIG. 1), a three-dimensional surface plot using concentration, temperature and density is required (see FIG. 2). Concentration is determined from density by the following steps:

1. Applying temperature correction to density process material data. This step maps the current point on the density surface to the equivalent point on the reference temperature isotherm, producing a density-at-reference-temperature value (see FIG. 3).
2. Converting the corrected density value to a concentration value. Because all density values have been corrected for temperature, any change in density will be a result of a change in composition of the process material, and a one-to-one conversion can be applied.

Surface plots are generated from publicly available data tables (see FIG. 4) or from user specific data.

Figure 1:
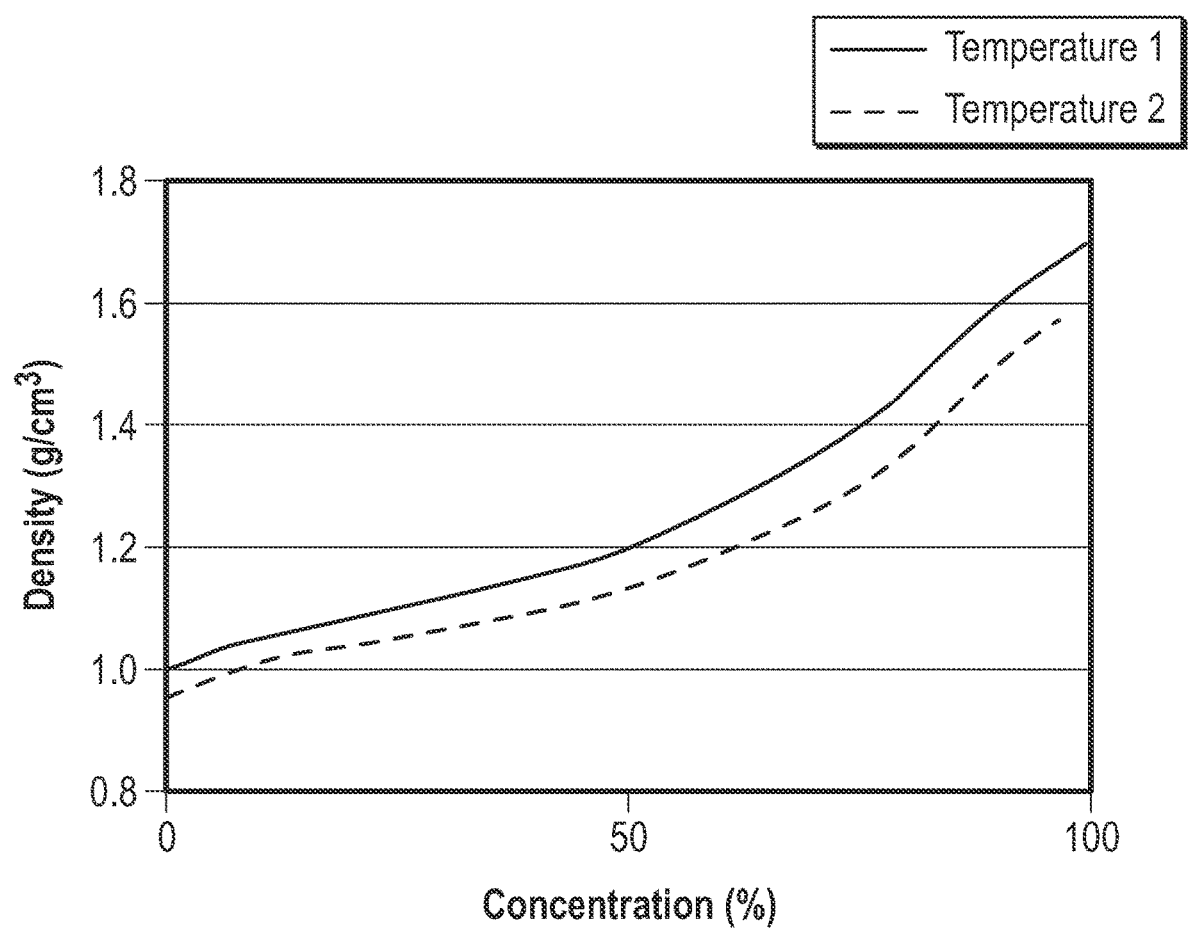
FIG. 1 is a graph of density v. concentration.
Figure 2:
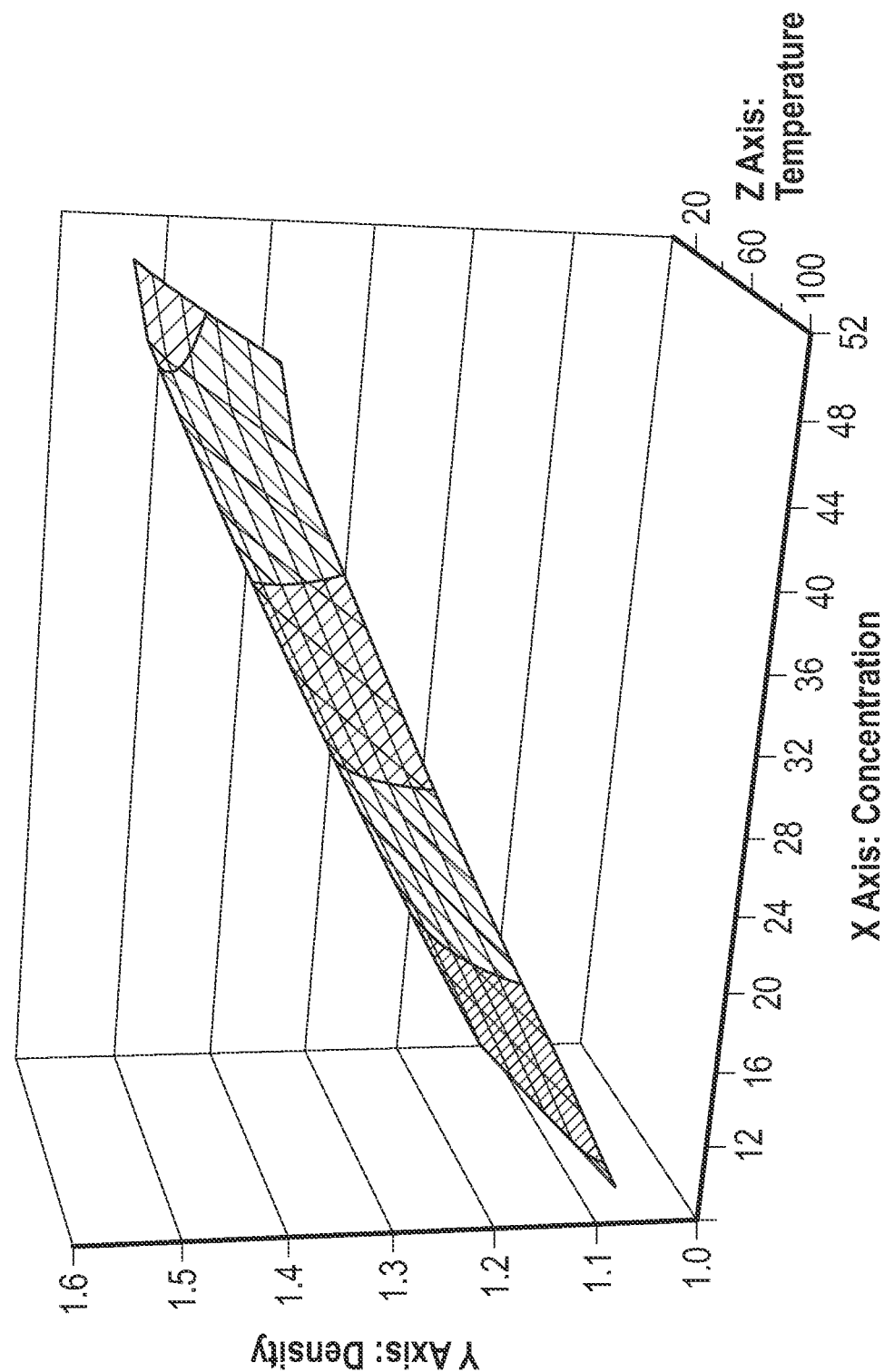
FIG. 2 is a three-dimensional plot of density, temperature and concentration.
Figure 3:
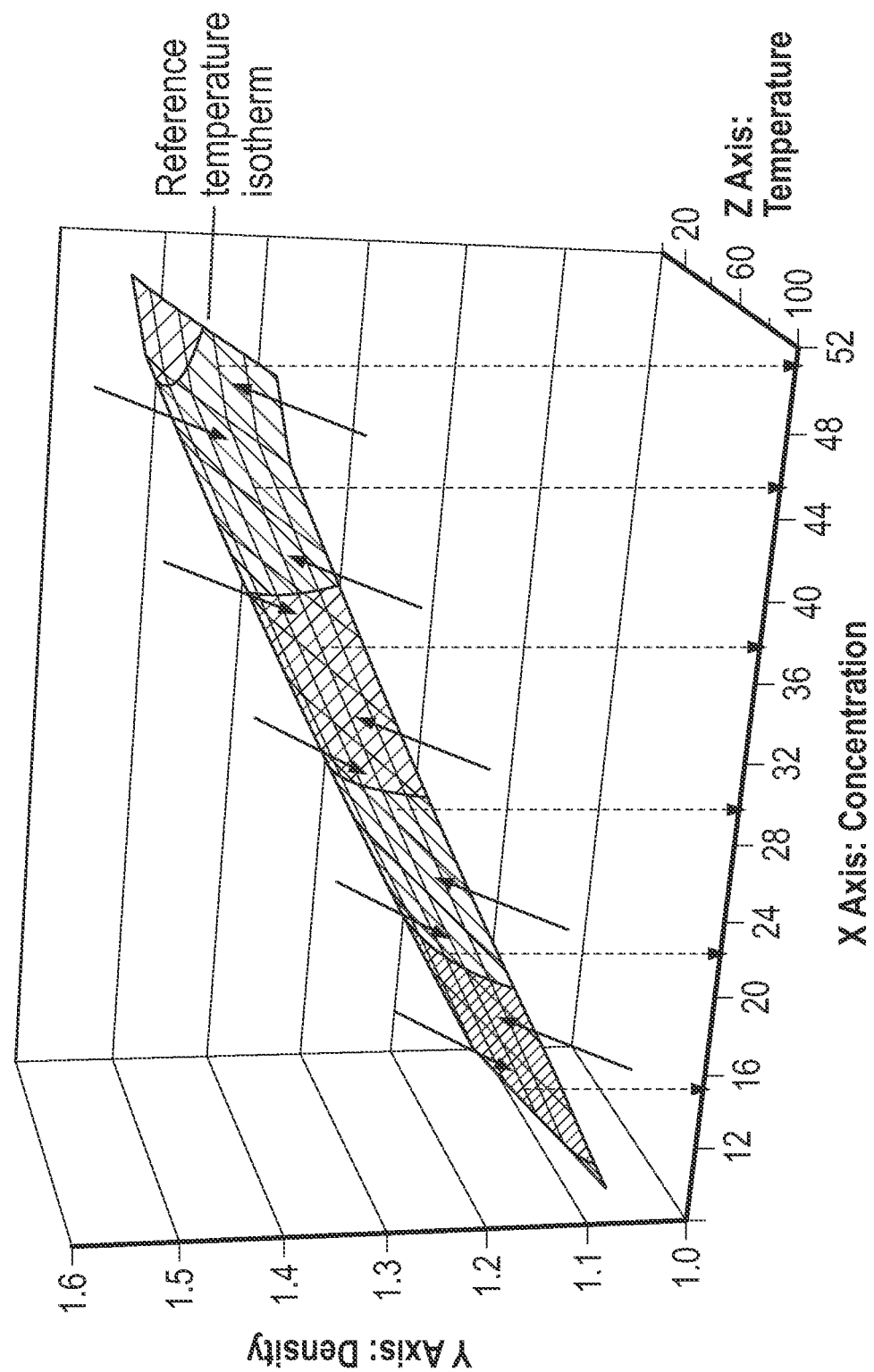
FIG. 3 is a three-dimensional plot of density, temperature and concentration showing temperature isotherms.
Figure 5:
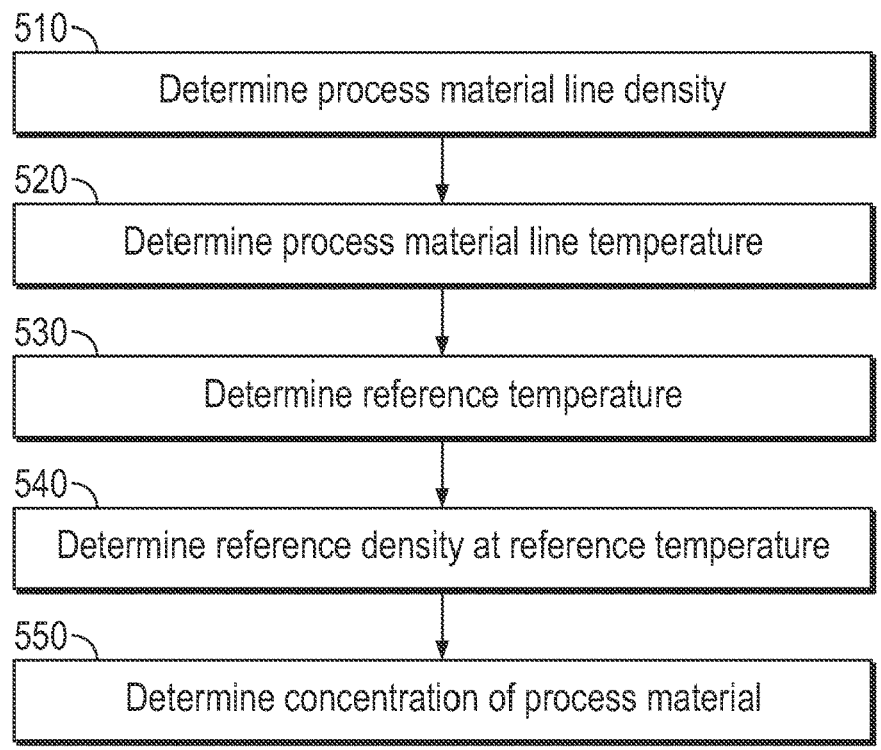
FIG. 5 is a flow chart illustrating a method according to an embodiment.

FIG. 5 shows an example operation to determine the percent concentration of a process material under test.

According to an embodiment, in Step 510, a process material line density is determined. In Step 520, a process material line temperature is determined. In embodiments of the present invention, the process material line density and line temperature are determined by known measurement metering systems including Coriolis sensors, density meters, vibrating densitometers, etc. In Step 530, a reference temperature is determined. The reference temperature is the temperature to which density values will be corrected to. In Step 540, a reference density is determined based on the reference temperature. In Step 550, a process material concentration is determined based on the reference temperature and reference density utilizing a process material matrix. The process material matrix is generated from data tables (see FIG. 4) and covers a range of density and temperatures and is stored in the metering system.

Figure 6:
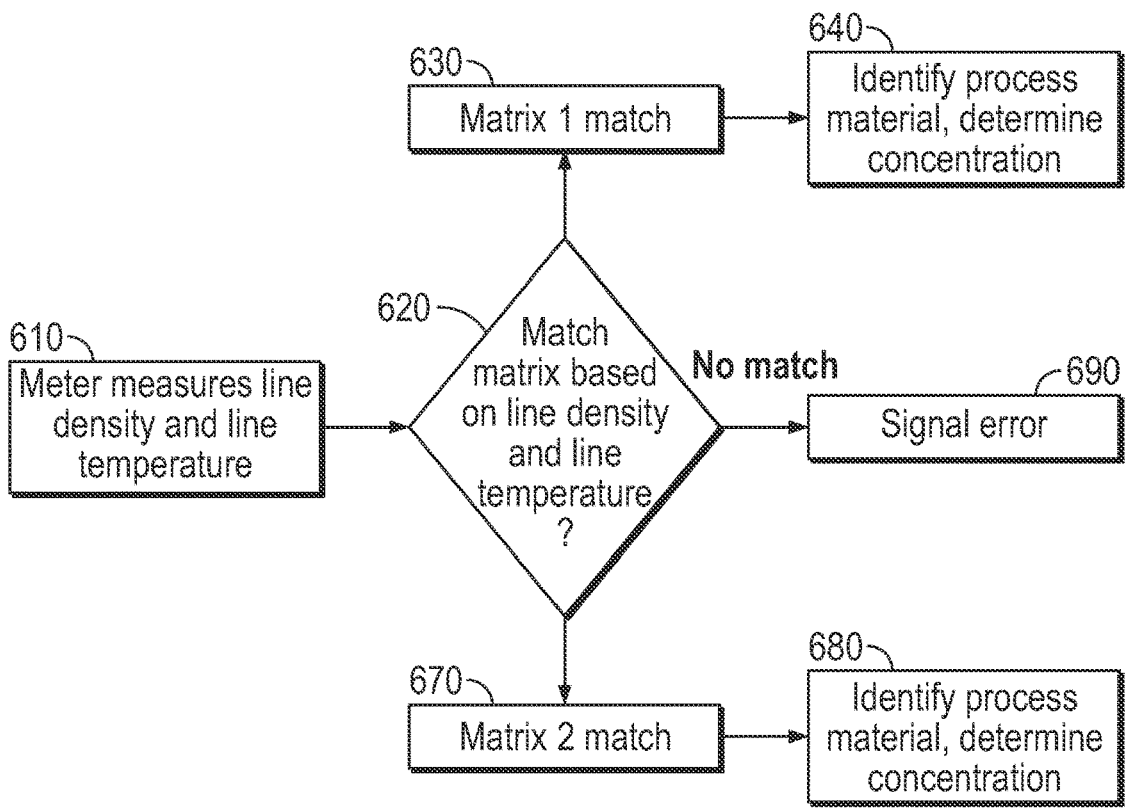
FIG. 6 is a flow chart illustrating a method according to an embodiment.

FIG. 6 shows an example operation according to an embodiment of the present invention. In this embodiment, the method allows for the metering system to store two or more different process material matrices, including two different ranges of density and temperature values. The process material matrices represent application and cleaning materials that may be used in a particular application.

In Step 610, the metering system measures line density and line temperature of an unknown material. In Step 620, based on the measured line density and measured line temperature, a determination is made as to which matrix should be used to determine the unknown material and its percent concentration. In Step 630, if the measured line density and measured line temperature values fall within the range of densities and temperatures of a first matrix, then the unknown material is identified as the process material associated with Matrix 1 and Matrix 1 is used to determine the concentration of the process material in Step 640. In Step 670, if the measured line density and line temperature values fall within the range of densities and temperatures of a second matrix, then the unknown material is identified as the process material associated with Matrix 2 and Matrix 2 is used to determine the concentration of the process material in Step 680. In Step 690, if the measured line density and line temperature values do not fall in the ranges of densities and temperatures of either the first or second matrices, an error is reported.

In embodiments of the present invention, the process material may be a particular application material or a cleaning material. Accordingly, the present invention provides for a decision making process that utilizes the measured line density and measured line temperature of an unknown material to automatically detect whether a material under test is that of a particular application material or a cleaning material and determines the material's percent concentration. In the present embodiment, the metering system contains two matrices; however, it is contemplated that more than two can be utilized as necessary for a particular application.

FIG. 7 shows a reference table of temperature and density values of an example product solution (Brix) used for a matrix calculation stored in a meter. FIG. 8 shows a reference table of temperature and density values of an example cleaning solution NaOH (caustic soda) used for a matrix calculation stored in the same meter.

Using the above metering system and method, if the process material under test is found to have a line density of 1.1427 gm/cc and a line temperature of 40° C., the present invention recognizes that the line density and line temperature are in range of the Brix matrix and that the process material is comprised of a heavy solution (e.g. Brix). Accordingly, a matrix calculation corresponding to Brix would be used. For instance, based on the data above, a reference density of 1.1513 gm/cc would be determined based on the line density of 1.1427 gm/cc and a reference temperature of 20° C. The resulting concentration is a 35° Brix measurement.

Alternatively, if the process material under test is found to have a line density of 1.0248 gm/cc and a line temperature of 80° C., the present invention recognizes that the line density and line temperature are in range of the NaOH matrix and that the process material is comprised of a weak cleaning solution (e.g. caustic soda). Accordingly, a matrix calculation corresponding to NaOH would be used. For instance, based on the data above, a reference density of 1.0538 gm/cc would be determined based on the line density of 1.0248 gm/cc and a reference temperature of 20° C. The resulting concentration is a 5% Wt measurement.

In another embodiment, if the process material under test is found to have a line density of 0.9800 gm/cc and a line temperature of 50° C., the present invention recognizes that neither matrix matches the data. Based on the lack of a suitable matrix for the conditions, the meter would produce an indicator such as an alarm.

The following is an example use of the present invention. Various plants use caustic cleaning solution and discharge it into a city's water system. To meet emission standards, the total concentration of NaOH in the wastewater cannot exceed 5% concentration defined on mass (rather than volume).

Without the present invention, based on testing, the cleaning solution would be assumed to flow into the discharge tank at a concentration of 50%. Accordingly, to comply with emission standards, one unit of the cleaning solution should be diluted with 19 units of water. Periodically, samples are tested in the lab to monitor compliance. This approach has several drawbacks including: 1) the concentration of the cleaning solution may be different from the original sample, 2) the concentration of the cleaning solution may vary beyond tolerances, 3) laboratory testing is slow and expensive, and may not catch serious variance: some batches may be in violation of standards, while other batches contain more water than required, which is unnecessarily expensive, 4) processing waste one batch at a time is inefficient, and 5) there is no provision for handling bad batches.

Figure 9:
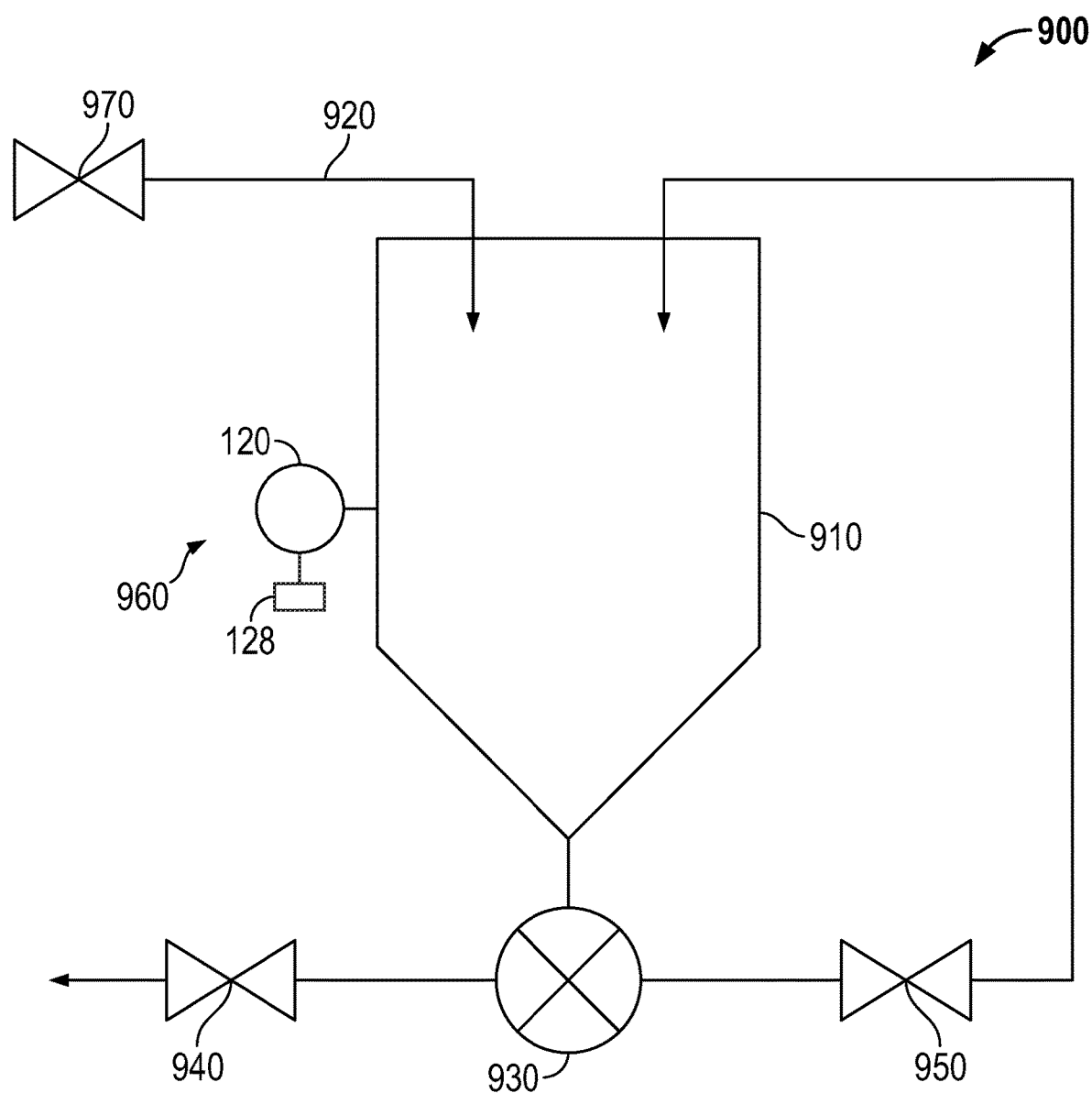
FIG. 9 shows an auto switching concentration application.

FIG. 9 shows a process application 900 according to an embodiment. A tank 910 holds a process material that can be comprised of an application material or a cleaning material. Tank 910 is filled via fill line 920. Once tank 910 is filled to an appropriate level, pump 930 pumps the process material to an outlet controlled by outlet valve 940 or a recirculation valve 950, depending on need. Utilizing the metering system and methods described herein, a continuous blending process could be implemented. In the current embodiment, a metering system 960, comprised of a meter 120 and meter electronics 128, is configured to measure concentration of the process material to determine the type of process material and its concentration. If metering system 960 determines that a cleaning material is in the tank, metering system 960 would determine the cleaning material concentration and, based on the concentration level, control an upstream valve 970 that would direct the flow of water into tank 910. As the concentration of the cleaning fluid changes, metering system 960 is able to compensate to maintain the required concentration level via valve 970, control output flow via valve 940 or recirculate the flow via recirculation valve 950. Advantageously: 1) any variation in the concentration of the cleaning solution flowing into the discharge tank is compensated for, immediately and automatically, 2) no laboratory testing is required, and 3) batching is eliminated, along with bad batches. Once the cleaning process has been completed and the cleaning fluid is replaced with the application material, metering system 960 would be able to determine the new material and automatically switch to the required matrix, thus eliminating any need to shut the system down and reconfigure the meter.

Figure 10:
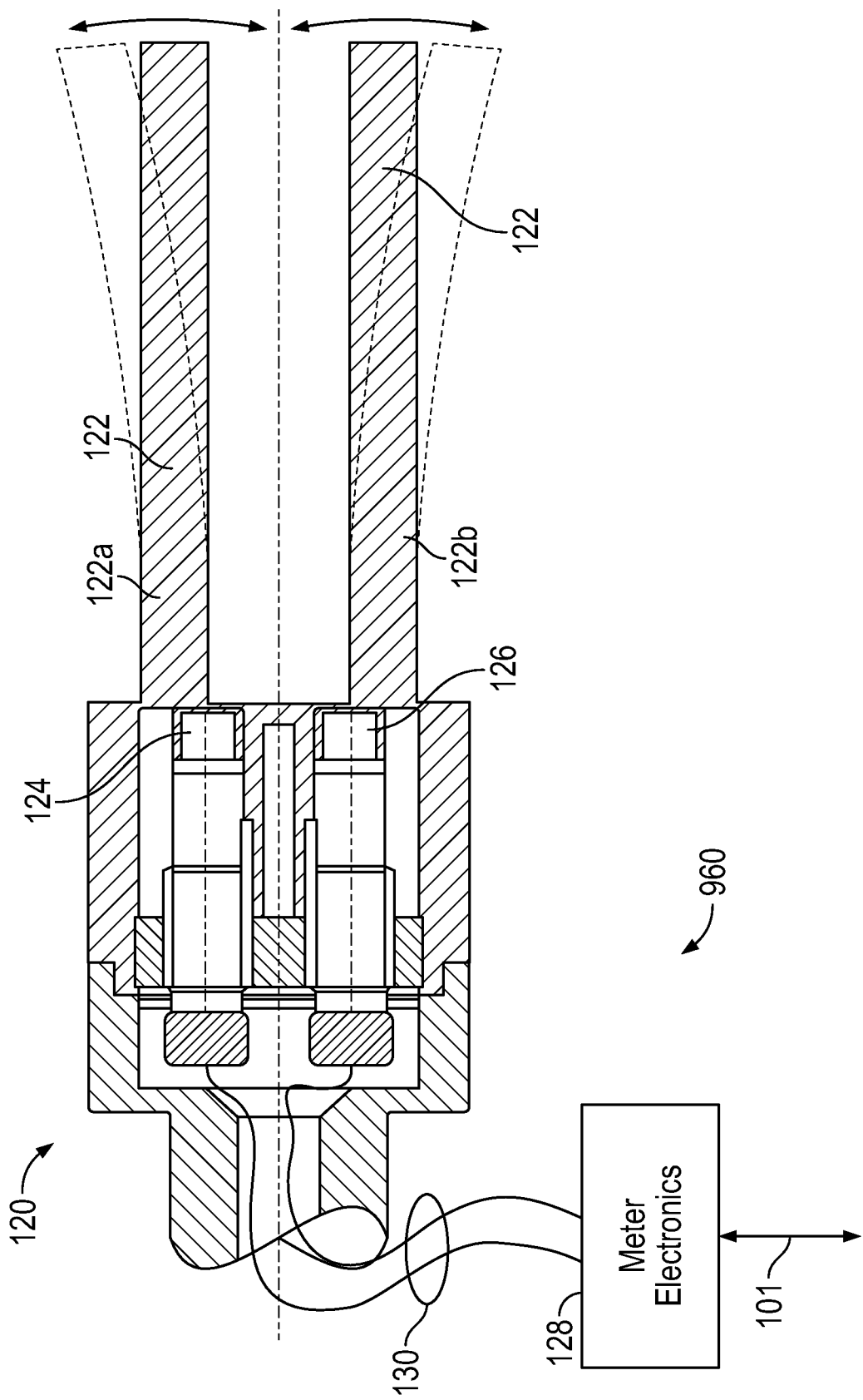
FIG. 10 shows a meter according to an embodiment.

FIG. 10 illustrates an example meter 120 of metering system 960. A vibratory element 122 (typically having a "fork" or "tine" design) is driven to vibrate at a frequency by a driver 124. A pickoff sensor 126 with the vibratory element 122 detects vibration of the vibratory element 122. Meter electronics 128 are connected to the driver 124 and pickoff sensor 126. Vibratory meters without forks or tines are also contemplated.

The meter electronics 128 may provide electrical power to the vibratory element 122 via the lead or leads 130. The leads 130 comprise connections for data, power, and the like from a power supply (not shown), meter electronics 128, or other control or computing devices (not shown). The meter electronics 128 may control operation of the meter 120 and vibratory element 122. For example, the meter electronics 128 may generate a drive signal and supply the drive signal to the driver 124, wherein the vibratory element 122 is driven to generate a vibration in one or more vibratory components, such as individual tines, using the drive signal. The drive signal may control the vibrational amplitude and/or may control the vibrational frequency. The drive signal may also control the vibrational duration and/or vibrational timing or phase.

The meter electronics 128 receives a vibration signal or signals from the vibratory element 122 via the lead or leads 130. The meter electronics 128 may process the vibration signal or signals in order to generate a density or viscosity measurement, for example. It should be understood that other or additional measurements may be generated from the vibration signal or signals. In one embodiment, the meter electronics 128 process the vibration signal or signals received from the vibratory element 122 to determine a frequency of the signal or signals. The frequency may comprise a resonant frequency of the vibratory element/fluid, which may be used to determine a density or viscosity of the fluid. In related embodiments, signals from the meter electronics 128 are sent to other computing or process devices for processing.

The meter electronics 128 may also process the vibration signal or signals to determine other characteristics of the fluid, such as a viscosity or a phase shift between signals that can be processed to determine a fluid flow rate, for example. Other vibrational response characteristics and/or fluid measurements are contemplated and are within the scope of the description and claims, such as the presence of solids suspended in a liquid and the presence of a liquid/solid interface. The meter electronics 128 may be further coupled to an interface 101, and the meter electronics 128 may communicate signals via this interface 101. The meter electronics 128 may process the received vibration signal to generate a measurement value or values and may communicate a measurement value or values via the interface 101. In addition, the meter electronics 128 may receive information over the interface 101, such as commands, updates, operational values or operational value changes, and/or programming updates or changes. In addition, the interface 101 can enable communications between the meter electronics 128 and a remote processing system (not shown). The interface 101 is capable of any manner of electronic, optical, or wireless communication, such as for example 4-20 ma, HART, RS-485, Modbus, Fieldbus, and the like, without limitation.

In an embodiment, the driver 124 and pickoff sensor 126 each comprise piezo-electric crystal elements. The driver 124 and pickoff sensor 126 are located adjacent to first 122A and second tines 122B of the vibratory element 122. The driver 124 and pickoff sensor 126 are configured to contact and mechanically interact with the first and second tines 122A, 122B. In particular, the driver 124 may contact at least a portion of the first tine 122A. The driver 124 expands and contracts when subjected to a drive signal or reference signal provided by meter electronics 128. As a result, the driver 124 alternatingly deforms and therefore displaces the first tine 122A from side to side in a vibratory motion (see dashed lines), disturbing the fluid in a periodic, reciprocating manner. Vibration of the second tine causes a corresponding electrical signal to be generated by the pickoff sensor 126. The pickoff sensor 126 transmits the vibration signal to the meter electronics 128. The meter electronics 128 processes the vibration signal and may measure the vibration signal amplitude and/or the vibration signal frequency of the vibration signal. The meter electronics 128 may also compare the phase of the signal from the pickoff sensor 126 to a reference phase signal that is provided by the meter electronics 128 to the driver 124. Meter electronics 128 may also transmit the vibration signal via the interface 101.

The meter 120 is at least partially immersed into a fluid to be characterized. For example, the meter 120 may be mounted in a pipe or conduit. The meter 120 may be mounted in a tank or container or structure for holding a fluid. The meter 120 may be mounted in a manifold or similar structure for directing a fluid flow. Other mounting arrangements are contemplated, however, and are within the scope of the description and claims.

Figure 11:
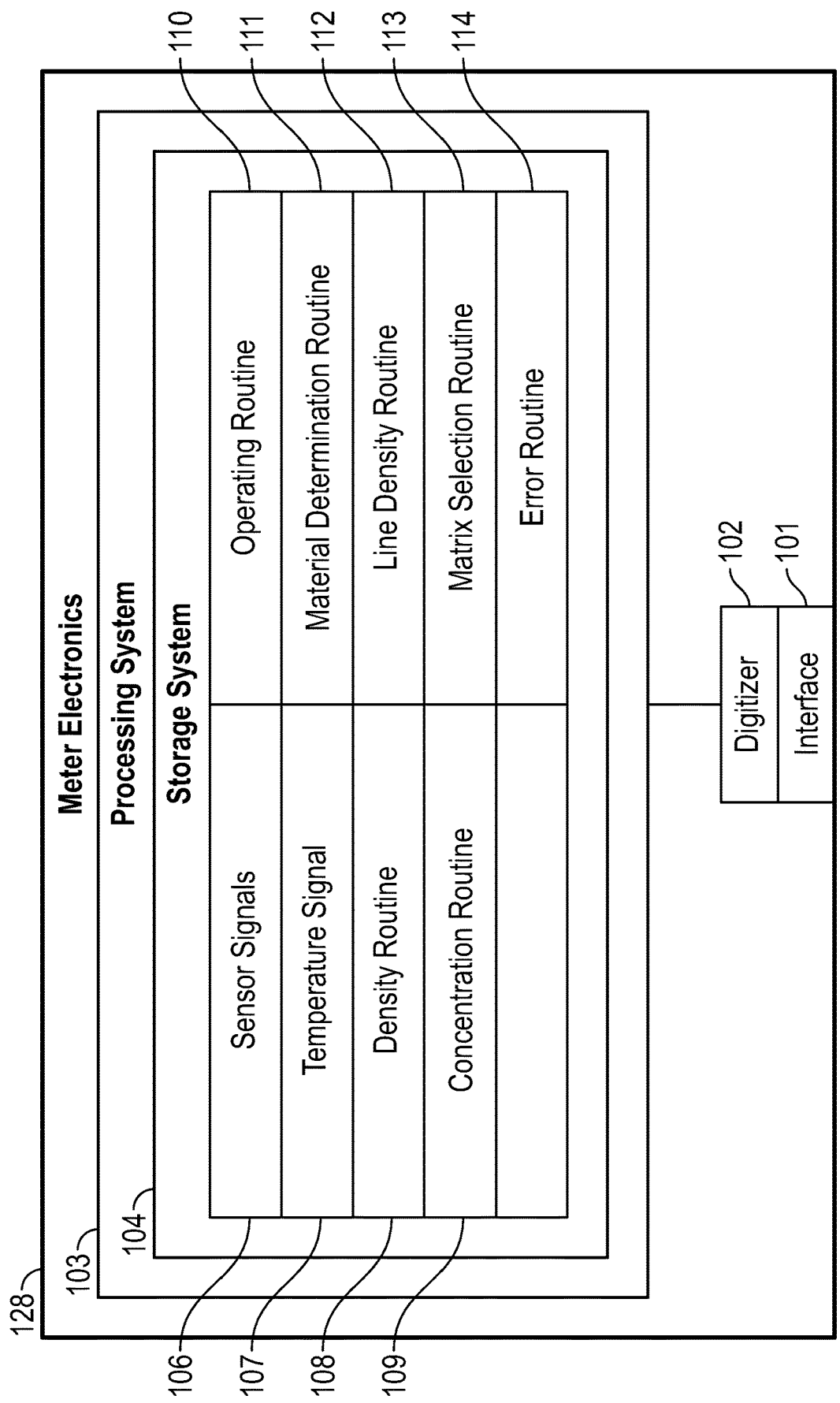
FIG. 11 shows a meter electronics according to an embodiment.

FIG. 11 illustrates an example meter electronics 128 of metering system 960. The meter electronics 128 can include an interface 101 and a processing system 103. The processing system 103 may include a storage system 104. The storage system 104 may comprise an internal memory, and/or may comprise an external memory. The meter electronics 128 can operate as a densitometer or can operate as a mass flowmeter, including operating as a Coriolis flowmeter. It should be appreciated that the meter electronics 128 may also operate as some other type of vibrating sensor assembly and the particular examples provided should not limit the scope of the present invention. The meter electronics 128 can process the sensor signals 106 in order to obtain flow characteristics of the process material being sensed by meter 120. In some embodiments, the meter electronics 128 may receive a temperature signal 107 from one or more RTD sensors or other temperature sensors, for example.

The interface 101 may perform any necessary or desired signal conditioning, such as any manner of formatting, amplification, buffering, etc. Alternatively, some or all of the signal conditioning can be performed in the processing system 103. In addition, the interface 101 can enable communications between the meter electronics 128 and external devices. The interface 101 can be capable of any manner of electronic, optical, or wireless communication.

The interface 101 in one embodiment can include a digitizer 102, wherein the sensor signal comprises an analog sensor signal. The digitizer 102 can sample and digitize the analog sensor signal and produce a digital sensor signal. The digitizer 102 can also perform any needed decimation, wherein the digital sensor signal is decimated in order to reduce the amount of signal processing needed and to reduce the processing time.

The processing system 103 can conduct operations of the meter electronics 128 and process flow measurements from meter 120. The processing system 103 can execute one or more processing routines, such as a density routine 108, a concentration routine 109, an operating routine 110, a material determination routine 111, a matrix selection routine 113, and an error routine 114, for example, without limitation. According to an embodiment, the meter electronics 128 can also measure a temperature signal 107, and associate that temperature with the densities captured at a given temperature.

The meter 120 may generate a line density 112. The line density 112 may be calculated, for example, as part of the operating routine 110.

The processing system 103 can comprise a general purpose computer, a micro-processing system, a logic circuit, or some other general purpose or customized processing device. The processing system 103 can be distributed among multiple processing devices. The processing system 103 can include any manner of integral or independent electronic storage medium, such as the storage system 104.

It should be understood that the meter electronics 128 may include various other components and functions that are generally known in the art. These additional features are omitted from the description and the figures for the purpose of brevity. Therefore, the present invention should not be limited to the specific embodiments shown and discussed.

The present description depicts specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention.

The detailed descriptions of the above embodiments are not exhaustive descriptions of all embodiments contemplated by the inventor to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein may be applied to other embodiments than those described above and shown in the accompanying figures. Accordingly, the scope of the invention is determined from the following claims.

The invention claimed is:

1. A method of detecting a process material in a process line using a meter containing at least two or more process material matrices respectively associated with two or more process materials of tabulated data stored in an electronic unit, the two or more process material matrices including at least a first process material matrix associated with a first process material, and a second process material matrix associated with a second process material, the first process material being different from the second process material, said method comprising the steps of:
   measuring a line density of the process material;
   measuring a line temperature of the process material; and
   identifying the first process material matrix associated with the first process material from the two or more process material matrices upon determining that the line density is within a first range of densities and the line temperature is within a range of temperatures, the first process material matrix comprising a first range of concentrations of the first process material at the first range of densities and the first range of temperatures, and the second process material at a second range of densities and a second range of temperatures.

2. The method of detecting a process material in a process line of claim 1, wherein the step of identifying the first process material matrix further including the step of:
   determining that the line density is not within the second range of densities if the line temperature is not within the second range of temperatures.

3. The method of detecting the first process material in a process line of claim 1, wherein the step of identifying a process material matrix further including the steps of:
   signaling an error if said process material line density and line temperature does not fall within a range of matrix line density values and a range of matrix line temperature values associated with each of the two or more matrices.

4. The method of detecting a process material in a process line of claim 1, further including the steps of:
   determining a reference temperature of the first process material;
   determining a reference density of the material based on the line density, the line temperature, and the reference temperature; and
   determining a concentration of the material based on the reference density and reference temperature.

5. The method of claim 1, further comprising:
   determining a concentration of the first process material;
   upon determining that the concentration is not approximately equal to a predetermined concentration, operating a valve in fluid communication with the process material to control the concentration of the first process material at the predetermined concentration.

6. A metering system (960) for detecting a process material in a process line using at least two or more process material matrices respectively associated with two or more process materials, said metering system comprising:
   a meter (120) in fluid communication with a process material, wherein the meter (120) is configured to detect a density of the process material; and
   meter electronics (128) in communication with a meter (120), wherein the meter electronics further comprises:
   a storage system (104) for storing two or more process material matrices, the two or more process material matrices including at least a first process material matrix associated with a first process material and a second process material matrix associated with a second process material, wherein the first process material is different than from the second process material; and
   a line density routine (112) for determining a line density of the process material;
   a temperature determination routine for measuring a line temperature of the process material; and
   a matrix selection routine (113) for identifying the first process material matrix associated with the first process material from the two or more process material matrices based on the line density and line temperature comprising determining that the line density is within a first ranged of densities and the line temperature is within a first range of temperatures, the first process material matrix comprising a first range of concentrations of the first process material at the first range of densities and the first range of temperatures, and the second process material comprising a second range of concentrations of the second process material at a second range of densities and second range of temperatures.

7. The metering system (960) of claim 6, wherein material determination routine (111) further comprises:
   an error routine (114) for signaling an error if said material determination routine (111) fails to identify at least one process material matrix of the two or more matrices.

8. The metering system (960) of claim 6, wherein the meter electronics (128) further comprises:
   a density routine (108) for determining a reference temperature of the first process material and a reference density of the material, wherein the reference density is based on the line density and the reference temperature; and a concentration routine (109) for determining a concentration of the material based on the reference density and reference temperature.

9. The metering system of claim 6, further comprising a valve in communication with the process material, the meter system comprising:
   a concentration determination routine for determining the concentration of the first process material; and
   a concentration control routine for, upon determining that the concentration is not approximately equal to a predetermined concentration, operating the valve to control the concentration of the first process material at the predetermined concentration.

10. A meter electronics (128) comprising:
    a storage system (104) for storing two or more process material matrices, the two or more process material matrices including at least a first process material matrix associated with a first process material and a second process material matrix associated with a second process material, wherein the first process material is different from the second process material;
    a line density routine for determining a line density of the first process material;
    a temperature determination routine for measuring a line temperature of the first process material; and
    a matrix selection routine for identifying the first process material matrix associated with the first process material from the two or more matrices based on the line density and the line temperature comprising determining that the line density is within a first range of densities and the line temperature is within a first range of temperatures, the first process material matrix comprising a first range of concentrations of the first process material at the first range of densities and the first range of temperatures, and the second process material matrix comprising a second range of concentrations of the second process material at a second range of densities and a second range of temperatures.

11. The meter electronics (128) of claim 10, wherein material determination routine (111) further comprises:
    an error routine (114) for signaling an error if said material determination routine (111) fails to identify at least one process material matrix from the two or more process material matrices.

12. The meter electronics (128) of claim 10, further comprising:
    a density routine (108) for determining a reference temperature of the first process material and a reference density of the material, wherein the reference density is based on the line density and the reference temperature; and
    a concentration routine (109) for determining a concentration of the material based on the reference density and reference temperature.

13. The metering electronics of claim 10, further comprising:
    a concentration determination routine for determining the concentration of the first process material; and
    a concentration control routine for, upon determining that the concentration is not approximately equal to a predetermined concentration, operating the valve to control the concentration of the first process material at the predetermined concentration.

* * * * *